US006938023B1

(12) United States Patent
Ryan, Jr. et al.

(10) Patent No.: US 6,938,023 B1
(45) Date of Patent: Aug. 30, 2005

(54) METHOD OF LIMITING KEY USAGE IN A POSTAGE METERING SYSTEM THAT PRODUCES CRYPTOGRAPHICALLY SECURED INDICIUM

(75) Inventors: Frederick W. Ryan, Jr., Oxford, CT (US); Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/220,657

(22) Filed: Dec. 24, 1998

(51) Int. Cl.[7] ................................................ G06F 17/00
(52) U.S. Cl. ......................... 705/408; 705/410; 705/61; 705/401
(58) Field of Search ............................. 705/60, 61, 62, 705/63, 400–500

(56) References Cited

U.S. PATENT DOCUMENTS

| | | | | | |
|---|---|---|---|---|---|
| 5,186,498 | A | * | 2/1993 | Dietrich | 283/67 |
| 5,508,933 | A | | 4/1996 | Abumehdi | 364/464.02 |
| 5,666,421 | A | * | 9/1997 | Pastor et al. | |
| 5,687,237 | A | * | 11/1997 | Naclerio | |
| 5,708,710 | A | | 1/1998 | Duda | 380/21 |
| 5,819,240 | A | * | 10/1998 | Kara | 705/408 |
| 5,978,781 | A | * | 11/1999 | Sansone | 705/408 |
| 6,041,317 | A | * | 3/2000 | Brookner | 705/61 |
| 6,064,989 | A | * | 5/2000 | Cordery et al. | 705/50 |
| 6,144,950 | A | * | 11/2000 | Davies et al. | 705/401 |
| 6,157,919 | A | * | 12/2000 | Cordery et al. | 705/60 |

FOREIGN PATENT DOCUMENTS

| | | | | | |
|---|---|---|---|---|---|
| EP | 0649120 | A2 | | 4/1995 | G07B/17/04 |
| EP | 0811955 | A2 | | 12/1997 | G07B/17/04 |
| JP | 408273011 | A | * | 10/1996 | |

OTHER PUBLICATIONS

StampMaster, Announces U.S. Postal Service Approval for Beto of New Internet Postage Solution, Aug. 25, 1998.*
Website of ebusiness dot com, Sep. 1998.*
Website of stamps dot com, Aug. 1998.*
Website of jya dot com, Oct. 1996.*
Website of cl.cam.ac.uk, Nov. 1996.*

* cited by examiner

*Primary Examiner*—Pierre E. Elisca
(74) *Attorney, Agent, or Firm*—Steven J. Shapiro; Angelo N. Chaclas

(57) ABSTRACT

A method for requiring that a key used in a cryptographic apparatus be changed includes the steps of: storing a constraint value for a non-time parameter of the cryptographic apparatus, the non-time parameter being related to the operation of the cryptographic apparatus; and requiring the key to be changed when an actual value of the non-time parameter is not within a range defined by the constraint value.

3 Claims, 4 Drawing Sheets

METHOD OF LIMITING KEY USAGE IN A POSTAGE METERING SYSTEM THAT PRODUCES CRYPTOGRAPHICALLY SECURED INDICIUM

FIELD OF THE INVENTION

The instant invention relates to cryptographic modules, and more particularly, to cryptographic modules that require a change of cryptographic keys used therein base on a non-time parameter of the cryptographic module.

BACKGROUND OF THE INVENTION

The United States Postal Service (USPS) is currently advocating the implementation of a new Information-Based Indicia Program (IBIP) in connection with the printing of postage indicium by postage metering systems. Under this new program, each postage indicium that is printed will include cryptographically secured information in a barcode format together with human readable information such as the postage amount and the date of submission to the post office. The cryptographically secured information is generated using public key cryptography and allows a verification authority, such as the post office, to verify the authenticity of the printed postage indicium based on the information printed in the indicium and the printed destination address. Moreover, it has also been proposed to use secret key cryptography as an alternative to the public key system described above. In the secret key system verifiable cryptographically secured information is also included as part of the indicium.

Regardless of whether a public or secret key system is utilized, both systems use a key that is securely and secretly stored within the postage meter. This stored key is referred to as a private key in a public key system and a secret key in a secret key system. In either case, the stored key is used to cryptographically secure certain information contained within the printed postage indicium. However, since the security of either system is dependent upon maintaining the secrecy of the stored key, it is imperative that such stored key not be compromised.

One of the ways that the stored key becomes vulnerable to attack such as cryptoanalysis, differential fault analysis, and differential power analysis is based on its use. That is, the more the stored key is used to cryptographically secure data the more vulnerable it is to these attacks. In order to partially solve this problem, it has been suggested to require the postage meter to obtain a new secret key after a predetermined period of time has expired. The problem with this method is that it does not necessarily reflect the actual usage of the stored key in generating cryptographically secured indicia images. Thus, if a specific postage meter has extremely high usage, waiting for the predetermined period of time to expire before requiring the changing of the stored key may not be a satisfactory security solution.

Accordingly, what is needed is a method for ensuring the secrecy of a stored key in a device which produces cryptographically secured data, the method requiring a change of the stored key based on an indicator of actual use of the stored key in producing cryptographically secured data.

SUMMARY OF THE INVENTION

It is an object of the invention to overcome the deficiencies of the prior art devices discussed above. This object is met by providing a method that includes the steps of: storing a constraint value for a non-time parameter of a cryptographic apparatus, the non-time parameter being related to the operation of the cryptographic apparatus; and requiring a key used by the cryptographic apparatus to be changed when an actual value of the non-time parameter is not within a range defined by the constraint value.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
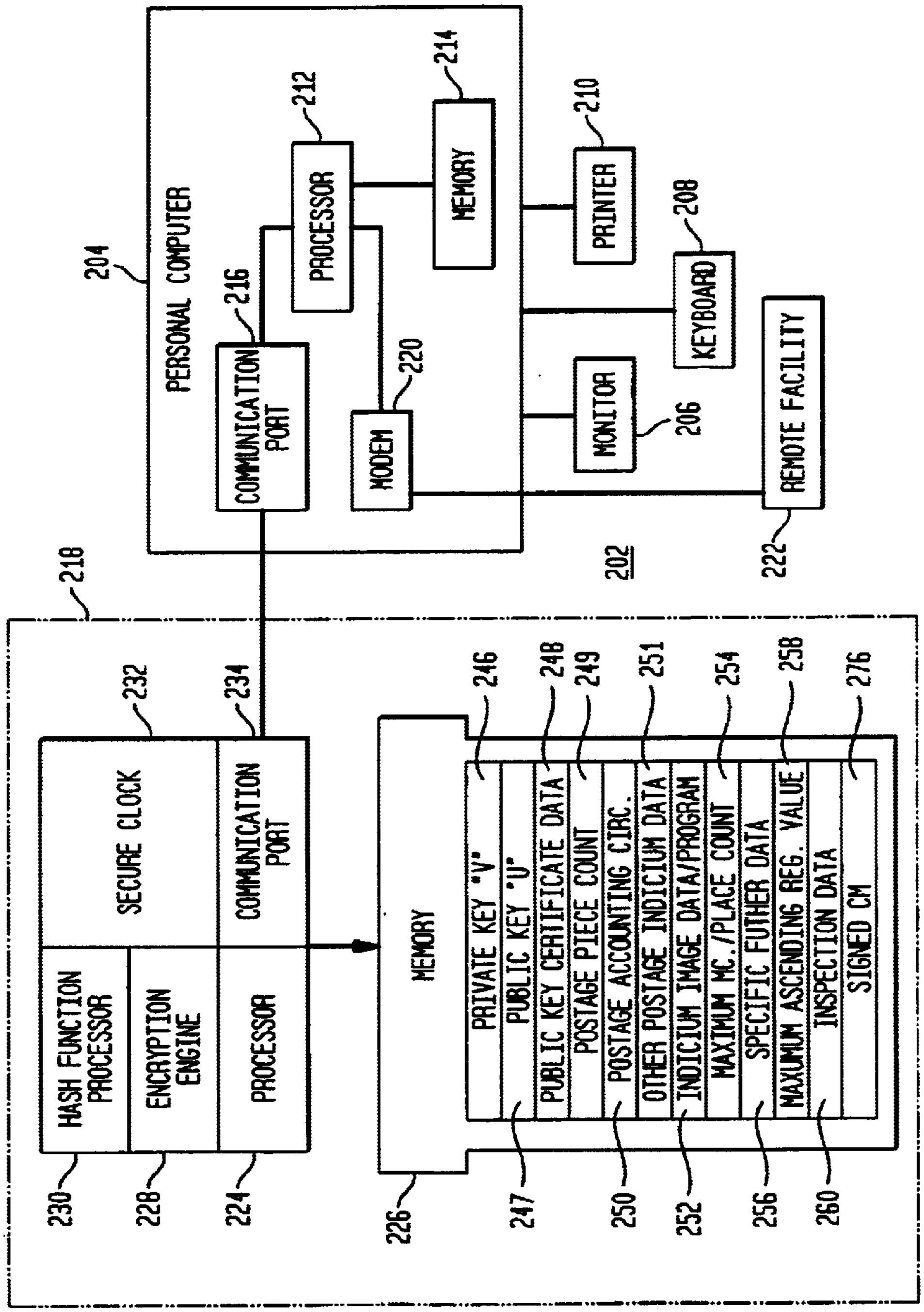
FIG. 1 is a schematic view of a postage metering system incorporating the claimed invention.

Referring to FIG. 1, a postage metering system, shown generally at 202, includes a personal computer 204 connected to a monitor 206, a keyboard 208, and a printer 210. The personal computer 204 additionally includes a processing subsystem 212 having an associated memory 214. The processing subsystem 212 is connected to a communications port 216 for communication with a secure postage meter accounting subsystem 218 and a modem 220 for communicating with a remote facility 222 which is not part of the postage metering system 202. It should be recognized that many variations in the organization and structure of the personal computer 204 as well as the secure postage metering accounting subsystem 218 could be implemented. As an example, the communications from the modem 220 to the remote facility can be by way of hardwire, radio frequency, or other communications including the Internet. The postage metering accounting subsystem 218 may take many forms such as, for example, a secure vault type system, or a secure smart card system.

The postage metering accounting subsystem 218 includes a processor 224 coupled to a memory 226. The processor 224 has associated with it an encryption engine 228, a hash function processor 230, a secure clock 232 and a communications port 234. The memory 226 may have stored within it different data as well as the operating programs for the postage metering accounting subsystem 218. The data shown as stored in memory 226 includes a private key 246 of a specified length (i.e. 512, 1024, to 4096 bits), a corresponding public key 247, public key certificate data 248 (which could either be an actual public key certificate or a unique public key certificate identifier), an issued indicium piece count 249, conventional postage accounting ascending/descending register circuitry 250 which accounts for the amount of postage dispensed, other data 251 which may be included as part of the printed indicium (such as an algorithm identifier, customer identifier, and software identifier), indicium image data and associated programming 252 used to build the postage indicium image, a maximum piece count 254, a specific future date 256, and a maximum ascending register value 258. The accounting:

circuitry 250 can be conventional accounting circuitry which has the added benefit of being capable of being recharged with additional prepaid postage funds via communication with a remote data center.

Figure 2:
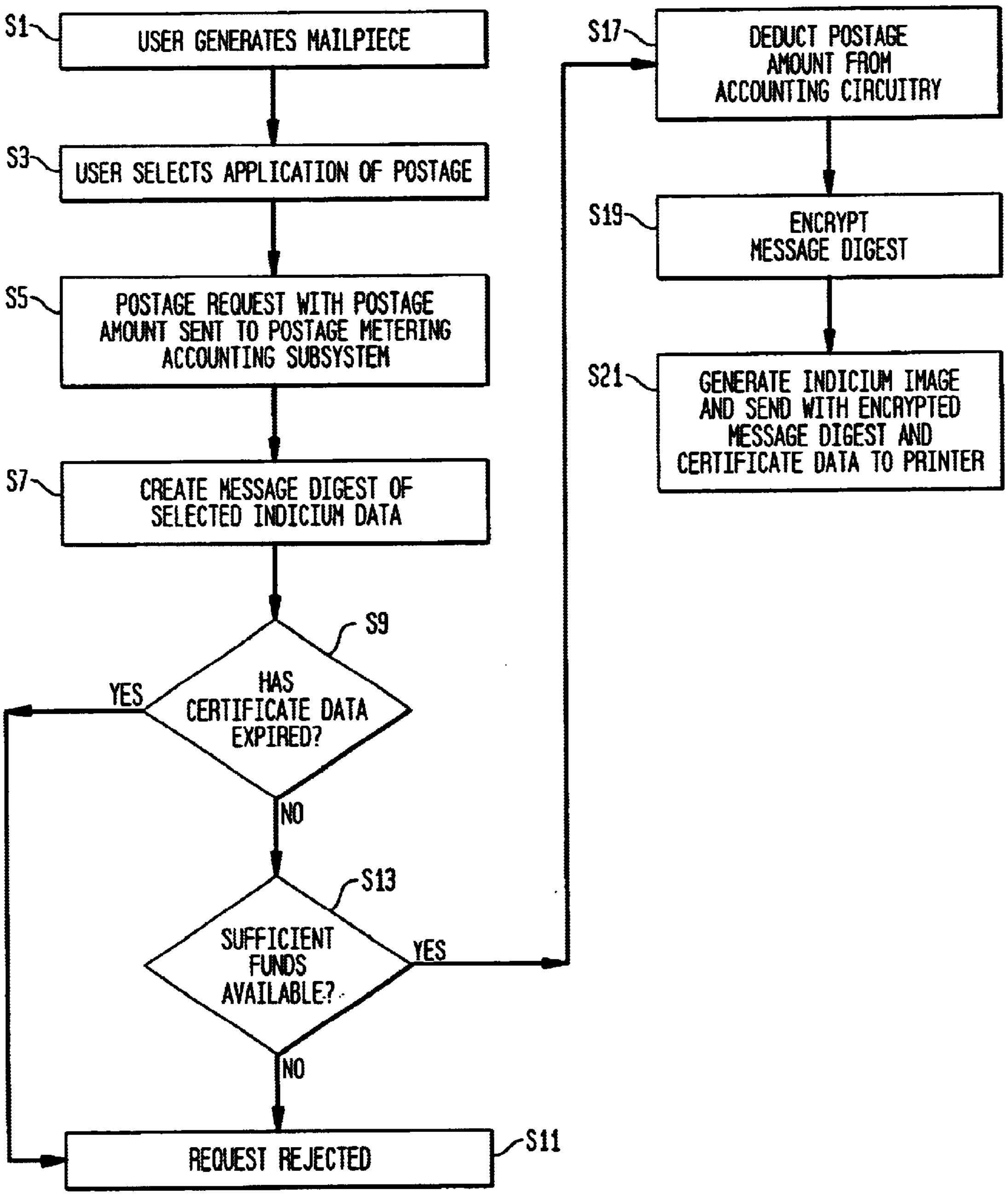
FIG. 2 is a flowchart showing the generation of a postage indicium within the postage metering system of FIG. 1.

Referring to FIG. 2, the operation of the postage metering system 202 will be explained in connection with generating and printing a postage indicium. At step S1, a user generates a mailpiece utilizing an application program stored in memory 214. Upon completion of the mailpiece the user can elect to have postage applied thereto by clicking on an icon appearing on monitor 206 or alternatively pressing a special function key of keyboard 208 (step S3). In either case, once the postage application option has been elected, the personal computer 204 sends such request together with the requested postage amount to the postage metering accounting subsystem 218 via the communication ports 216 and 234 (step S5). At step S7, the hash function processor 230 generates a message digest of selected data to be included as part of the indicium. The postage metering accounting subsystem 218 then checks the corresponding certificate data 248 to determine if it has expired (beyond validity date) (step S9). If the answer at step S9 is "YES", the request is rejected and the user notified of such rejection via the monitor 206 at step S11. If the answer at step S9 is "NO", the postage metering subsystem 218 determines if sufficient funds are available in the accounting circuitry 250 to pay for the requested postage (step S13). If the answer at step S13 is "NO" the request is rejected and the user is notified of such rejection via the monitor 206 (step S11). On the other hand, if the answer at step S13 is "YES" the amount of the postage to be dispensed is deducted within the accounting circuitry 250 (step S17). At step S19 the message digest is then encrypted utilizing the private key 246 and the encryption engine 228 (which contains the encryption algorithm). The indicium image is then generated using the indicium image data and program 252 and the indicium image including the encrypted message digest and the certificate data 248 are sent via the computer 204 to the printer 210 for printing on a mailpiece such as an envelope (step S21). The above description relative to the generation of the digitally signed postage indicium and operation of the postage metering system is known such that a further detailed discussion is not considered warranted.

Returning to FIG. 1, it is currently known to store an inspection date 260 within the memory 226 of the postage metering system 202. This inspection date 260 is used to ensure that the postage metering system 202 communicates with the data center 222 on a regular basis to accomplish a remote inspection of the postage metering system 202 by the remote data center 222. That is, if the secured clock 232 shows a current date that is beyond the stored inspection date 260, the postage metering system 202 is programmed to inhibit the printing of a postage indicium until the postage metering system 202 contacts the data center 222 and successfully performs the required remote inspection. Upon successful completion of the remote inspection, the data center 222 initiates storing of a new next inspection date in the postage metering system 202 memory 226 thereby allowing continued operation of the postage metering system 202 for printing indicium. The same concept utilizing the specific future date 256 can be used to ensure that the key pair 246 and 247 is periodically changed. That is, when the secure clock 232 reaches the specific future date 256, the postage metering system 202 is required to contact the data center 222 in order to initiate the storing of a new key pair 246, 247 in the postage metering system 202. Until this contact is made, the postage metering system 202 is incapable of producing a valid indicium with the expired key pair 246,247 and/or the postage metering system can be rendered incapable of printing an indicium.

The above described time dependent system in which the keys are required to be changed over time is deficient, as previously discussed, because it does not take into account the actual usage (number of times used) of the private key 246 in cryptographically securing data. Thus, a high usage postage metering system 202 may be more susceptible to a cryptoanalysis attack than a low usage system over the same time period. The instant invention overcomes this problem by requiring a change of keys based upon a non-time parameter value such as one that is indicative of the amount of usage of the stored cryptographic keys 246,247 in generating cryptographically secured postage indicium. For example, the stored maximum piece count 254 and/or the maximum ascending register value 258 can be the parameter values used to require that a new key pair 246,247 be generated. Thus, when the postage piece count 249 is the same as the maximum piece count 254, or the maximum ascending register value 258 is the same as the ascending register value in the accounting circuitry 250, the postage metering system 202 requires itself to communicate with the remote data center 222 to initiate, in a known manner, the generation and storage of new keys 246,247 in memory 226. The programming in postage metering system 202 is such that until the communication with the data center 222 and the generation and storage of new keys 246,247 is successfully completed, the printing of a valid postage indicium by the postage metering system 202 is not possible and/or the postage metering system 202 is inhibited from printing a postage indicium. Additionally, as part of the new key generation communication with the data center 222, the data center 222 sends to the postage metering system 202 a new maximum piece count 254 and a new maximum ascending register value 258 associated with the newly stored key pair 246,247 to permit continued printing of valid postal indicium by the postage metering system 202.

The above discussed parameters of maximum piece count 254 and maximum ascending register value 258 are each directly related to the actual number of times that the private key 246 is used to cryptographically secure a postage indicium. That is, in many postage metering systems the piece count 249 will correspond on a one for one basis with the use of the public key 246. However, where the postage metering system 202 processes batches of mail that have a single postage indicium associated therewith, a separate counter could be used to count the generation of each indicium. Therefor, instead of a stored maximum piece count 254, a maximum indicium count would be stored to determine when a new key pair is required. On the other hand, while the ascending register value does not correspond on a one for one basis with the actual usage of the private key 246, it is indicative of the actual usage of the private key 246. For example, if the smallest postage that is applicable to a piece of mail is considered to be 32 cents, the maximum assumed usage of the postage metering system 202 would be the ascending register value divided by 32 cents. Thus, while this calculation does not represent the exact usage of the private key 246 it can be used to establish a maximum ascending register value 258 which is at least partially indicative of the actual usage of the private key 246. Moreover, the maximum ascending register value 258, in and of itself, represents a use of the private key 246 relative to an amount of postage dispensed. It may be desirable for security purposes to simply limit the use of the private key 246 because it has been used in conjunction with a predetermined amount of postage dispensed, regardless of the actual number of times the private key 246 has been used to dispense such postage.

Figure 3:
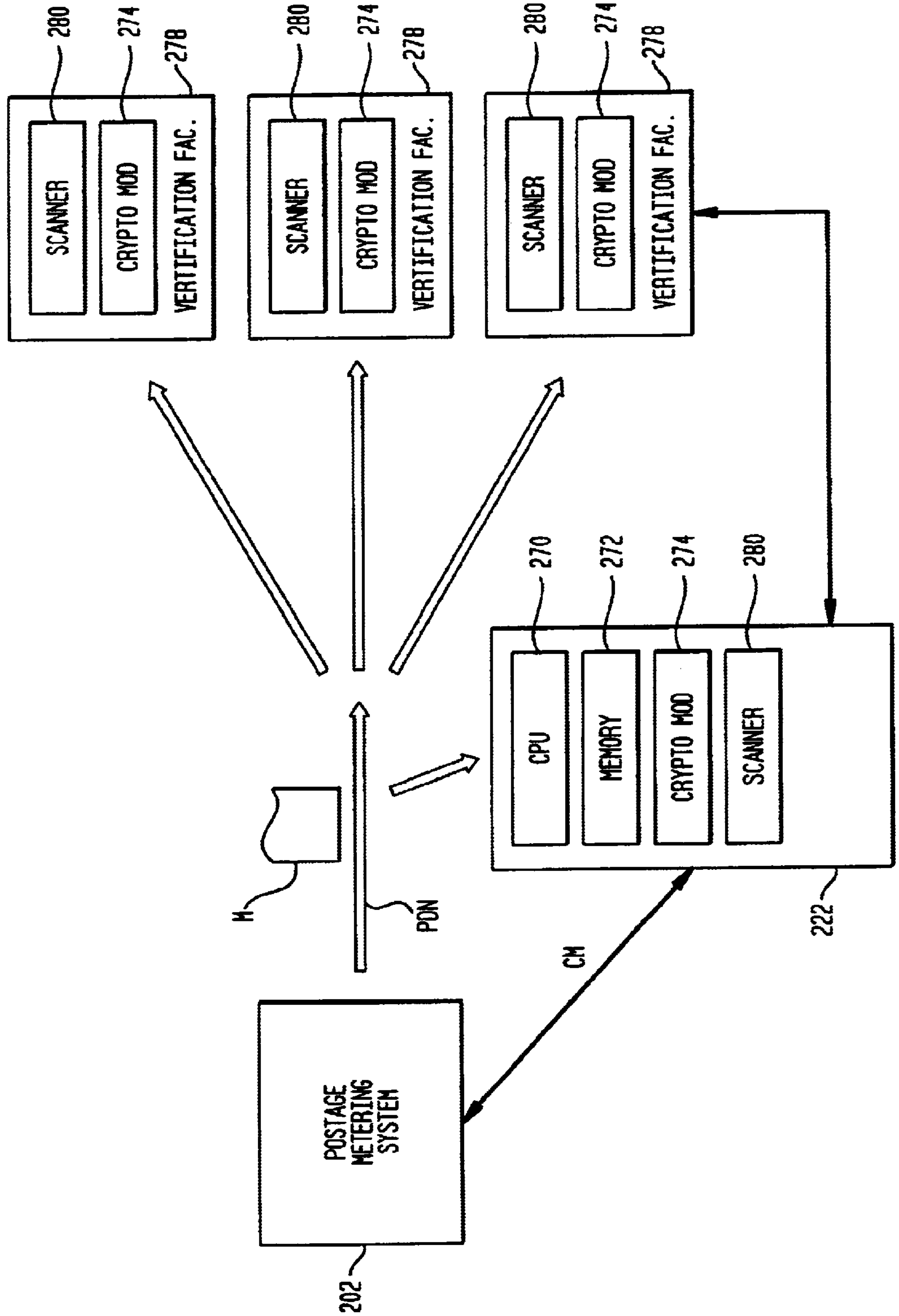
FIG. 3 is a schematic view of the inventive constraint message processing system.
Figure 4:
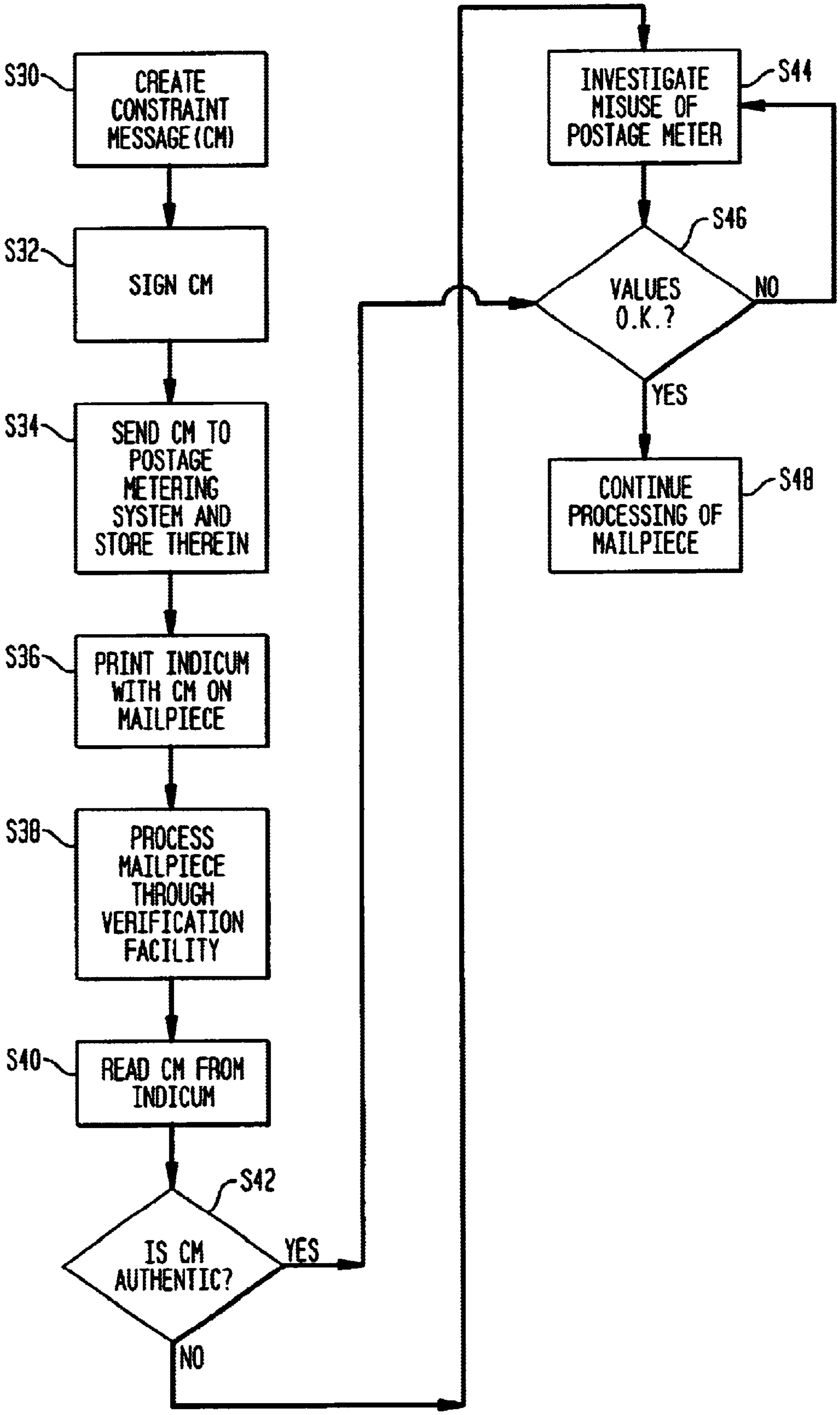
FIG. 4 is a flowchart showing the processing of the inventive constraint message.

As discussed above, after the successful generation and storage of new keys 246, 247 in the postage metering system 202 the data center 222 downloads a new maximum piece count value 254 and/or a new maximum ascending, register value 258 into the postage metering system 202. The new values form the basis for when the next set of keys is required to be installed in the manner described above. The downloading of these new values will now be described with reference to FIGS. 3 and 4. At step S30 the data center 222 utilizing its central processing unit 270, programs stored in memory 272, and a known public key cryptographic module 274 generates a constraint message (CM) that includes at least an identification of the postage metering system 202 (such as a serial number), and the applicable non-time parameter constraint value (which in the preferred embodiment are the maximum piece count 254 and the maximum ascending register value 258). The public key cryptographic module 274 is used to sign the CM in a conventional manner using a private key of the data center 222 (step S32). At step S34, the CM together with the signature is electronically sent to the postage metering system 202 in any conventional manner and the non-time parameter constraint value is stored in its designated location of memory 226 while the signed CM itself is stored at 276. Subsequent to step S34, each time a postage indicium is printed on a mailpiece "M" by the postage metering system 202, the stored signed CM is printed as either part of the indicium or alternatively on another part of the mailpiece "M" (step S36). In either case, once the mailpiece "M" enters the postal distribution network "PDN" it will eventually be processed through one of a plurality of verification facilities 278 which may or may not be the data center 222 (step S38). The verification facility 278 that receives the mailpiece "M" reads the signed CM and all of the other data contained on the indicium directly from the mailpiece "M" using conventional scanning equipment 280 (step S40). The verification facility 278 then verifies the authenticity of the signed CM using the cryptographic module 274 resident at the verification facility 278 itself or alternatively via communication with the data center 272 and its cryptographic module 274 (step S42). If the verification is not successful, an investigation into a potential misuse of the postage metering system 202 can be initiated (step S44). However, if the verification is successful, the non-time parameter value constraints set forth in the CM are compared to the corresponding non-time parameter values printed in the postage indicium itself to determine if the corresponding non-time parameter values do not exceed the non-time parameter value constraints of the CM (step S46). For example, if the maximum piece count 254 is the non-time parameter value constraint, the postage metering system 202 will print as part of the indicium the actual piece count 249 associated with that mailpiece "M". If this piece count 249 is greater than the maximum piece count 254 in the signed CM, an investigation of potential misuse of the postage metering system 202 is initiated at step S44. On the other hand, if the actual piece count 249 is less than the maximum piece count 254 of the signed CM the mailpiece "M" is processed for further distribution at step S48. Thus, the indicium including the signed CM provides an additional verification check above and beyond the USPS proposed IBIP requirements.

It is clear from the above description that even if an attacker obtains all of the secrets in the postage metering system 202, any indicium that he attempts to fraudulently print are detectable at the verification facility 278 if the indicium data does not fall within an acceptable range defined by the non-time parameter value constraint contained in the signed CM. Moreover, if the attacker tries to print extra indicium having piece counts within the piece count constraint value, then there will be detectable duplicate piece counts. Additionally, if the attacker tries to print extra indicium without exceeding the maximum ascending register value, there will be overlapping ascending register values that can be detected at the verification facility 278. That is, the duplicate piece counts and the overlapping ascending register values are detectable if the verification facilities or a central data base maintain a record of all of the scanned indicium at all verification facilities.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims. For example, the following are some examples of such modifications.

1. While the preferred embodiment has been described in connection with a postage metering system, it can be implemented in any apparatus that uses cryptographic keys to cryptographically secure data.
2. The postage metering system can use secret key cryptography for securing the indicium data. In this situation the stored secret key would be changed based on the non-time parameter value constrains.
3. Regarding the generation of the CM, it can be secured using secret key techniques as well as the described public key signature. That is, the CM can have attached to it in lieu of the signature a message authentication code (MAC) or a truncated MAC using conventional secret key technology.
4. While printing the signed CM with the indicium provides for an easy self verification system, an alternative is to have all of the signed CMS stored at the verification facilities. In this system, the verification facility would read the indicium to identify the specific postage metering system and would then obtain the non-time parameter constraint values from the stored signed CM data to verify if the printed indicium is valid.
5. The maximum piece count and the maximum ascending register values are representative examples of non-time parameter constraints that can be used to require a key change. Those possessing skill in the art will recognize the inventive concepts described herein can be used with other non-time constraint values as well.

What is claimed is:

1. A metering system that produces cryptographically secured indicium indicative of value dispensed by the metering system, the metering system comprising:

a key used to produce the cryptographically secured indicium;

a memory that stores a constraint value for a non-time parameter of the metering system, the non-time parameter associated with the operation of the metering system; and means for tracking an actual value of the non-time parameter based on actual operation of the metering system, for comparing the constraint value of the non-time parameter to the actual value of the non-time parameter, and for requiring the key to be changed when the actual value and the constraint value have a predetermined relationship.

2. A metering system as recited in claim 1, wherein the non-time parameter is one of a piece count, an indicium count, and an amount of value dispensed.

3. A metering system as recited in claim 1, wherein the key is required to be changed when the actual value is outside a range defined by the constraint value.

* * * * *